United States Patent
Fork et al.

(10) Patent No.: US 7,352,785 B2
(45) Date of Patent: Apr. 1, 2008

(54) SOLID STATE LASER MEDIUM AND LASER MEDIUM HEAT TRANSFER METHOD

(75) Inventors: Richard L. Fork, 106 Canterbury Cir., Madison, AL (US) 35758; Rustin Laycock, Huntsville, AL (US)

(73) Assignee: Richard L. Fork, Madison, AL (US)

( * ) Notice: Subject to any disclaimer, the term of this patent is extended or adjusted under 35 U.S.C. 154(b) by 319 days.

(21) Appl. No.: 11/120,303

(22) Filed: May 2, 2005

(65) Prior Publication Data

US 2005/0286577 A1   Dec. 29, 2005

Related U.S. Application Data

(60) Provisional application No. 60/567,089, filed on Apr. 30, 2004.

(51) Int. Cl.
*H01S 3/04* (2006.01)

(52) U.S. Cl. .......................................... 372/34; 372/36

(58) Field of Classification Search .................. 372/34, 372/35, 36
See application file for complete search history.

(56) References Cited

U.S. PATENT DOCUMENTS

| | | |
|---|---|---|
| 3,670,257 A | 6/1972 | McMahan |
| 3,679,999 A | 7/1972 | Chernoch |
| 3,872,401 A | 3/1975 | Cooley |
| 3,895,313 A | 7/1975 | Seitz |
| 4,899,347 A | 2/1990 | Kuchar et al. |
| 5,299,214 A | 3/1994 | Nakamura et al. |
| 5,325,384 A | 6/1994 | Herb et al. |
| 5,386,427 A | 1/1995 | Zayhowski |
| 5,781,573 A | 7/1998 | Basu |
| 5,796,766 A | 8/1998 | Hargis et al. |
| 5,985,684 A | 11/1999 | Marshall et al. |
| 6,101,201 A | 8/2000 | Hargis et al. |
| 6,188,706 B1 | 2/2001 | Robertson |
| 6,385,220 B1 | 5/2002 | Miller et al. |
| 6,396,864 B1 | 5/2002 | O'Brien et al. |
| 6,480,514 B1 | 11/2002 | Lorenzen et al. |
| 6,643,305 B2 | 11/2003 | Bewley et al. |
| 6,667,999 B2 | 12/2003 | Hasson et al. |
| 2003/0063638 A1 | 4/2003 | Hasson et al. |

OTHER PUBLICATIONS

Fork et al, Integrated Diamond Sapphire Laser, Oct. 6, 2003, Optics Express, vol. 11, No. 20, 2532-2548.*

(Continued)

*Primary Examiner*—Armando Rodriguez
(74) *Attorney, Agent, or Firm*—Alston & Bird LLP

(57) ABSTRACT

A solid state laser medium comprising at least one cooling element, i.e. cooling element, in contact with and alternating in series with at least one gain element. At least one cooling element and at least one gain element are joined at an interface having a center point, wherein the interface is physically modified at the interface such that the heat transfer coefficient at the interface decreases radially from the center point of the interface. The modified interface promotes thermal transfer from the gain element in the axial direction, in such a manner as to reduce thermal distortion affecting optical properties of the laser. Concentric radially disposed barriers to heat flow that hinder heat flow in the radial direction may be added within the gain element to further reduce thermal distortion within the laser medium.

15 Claims, 6 Drawing Sheets

OTHER PUBLICATIONS

Richard L. Fork et al., Integrated diamond sapphire laser, Oct. 6, 2003, pp. 2532-2548, vol. 11, No. 20, Optics Express, US.

http://www.uah.edu/News/2003news/wafers.html, Oct. 27, 2003, 2 pages.

Andrew S. Keys et al., Full cycle, low loss, low distortion phase modulation from multilayered dielectric stacks with terahertz optical bandwidth, Oct. 23, 2000, pp. 311-322, vol. 7, No. 9, Optics Express, US.

Matthew H. Smith et al., Safe Delivery of optical power from space, May 7, 2001, pp. 537-546, vol. 8, No. 10. Optics Express, US.

A. C. Defranzo and B. G. Pazol, Index of refraction measurement on sapphire at low temperatures and visible wavelengths, May 1, 1993, pp. 2224-2234, vol. 32, No. 13, Applied Optics, US.

Tso Yee Fan and John L. Daneu, Thermal Coefficients of the optical path length and refractive index in YAG, Mar. 20, 1998, pp. 1635-1637, vol. 37, No. 9, Applied Optics, US.

Di Yang et al., Infraref refractive index measurements using a new method, 2000, pp. 42-52, Optical Diagnostic Methods for Inorganic Materials II, Proceedings of SPIE vol. 4103.

T. Ruff, et al., Temperature dependence of the refractive index of diamond up to 925 K, Dec. 15, 2000, 4 pgs., vol. 62, No. 24, Physical Review B, The American Physical Society, US.

Toshimaro Sato, et al., Thermal expansion of a high purity synthetic diamond single crystal at low temperatures, Physical Review B, vol. 65, 4 pgs., 2002 The American Physical Society.

R. L. Fork, et al, Negative dispersion using pairs of prisms, May 1984, pp. 150-152; vol. 9, Optical Society of America, US.

R. L. Fork, et al., Compression of optical pulses to six femtoseconds by using cubic phase compension, Jul. 1987, 3 pgs., Optical Society of America.

Robert E. Hankey, et al., Third-Order Elastic constans of $Al_2O_3$, 1970, pp. 190-201, vol. 48 No. 1 (Part 2), The Journal of the Acoustical Society of America.

M. H. Grimsditch, et al., Brillouin scattering in diamond, Apr. 15, 1975, Physical Review B, vol. 11, No. 8, pp. 3139-3148.

J. D. Foster, et al. Thermal Effects in a Nd:YAG Laser, Aug. 1970, vol. 41, No. 9, Journal of Applied Physics.

M. H. Grimsditch, et al., Piezobirefringence in diamond, Mar. 15, 1979, vol. 19, No. 6, Physical Review B.

R. W. Dixon, Photoelastic Properties of Selected Materials and their Relevance for Applications to Acoustic Light Modulators and Scanners, Dec. 1967, vol. 38, No. 13, Journal of Applied Physics, pp. 5149-5153.

F. Benabid, et al., Birefringence measurements of sapphire test masses for laser interferometer gravitational wave detector, Jan. 19, 1998, Physcis Letters A 237 (1998) 337-342.

S. I. Novikova, Thermal Expansion of Diamonds Between 25 and 750°K, pp. 1464-1465.

Rosalind Wynne et al., Thermal Coefficients of the expansion and refractive index in YAG, May 20, 1999, pp. 3282-3284, vol. 38, No. 15, Applied Optics.

T. Numazawa, et al., Thermal conductivity measurements for valuation of crystal perfection at low temperatures, pp. 2089-2094, UK.

David C. Brown, Ultrahigh-Average-Power Diode-Pumped Nd:YAG and Yb:YAG Lasers, May 1997, IEEE Journal of Quantum Electronics, vol. 33, No. 5, pp. 861-873.

Y. S. Touloukian et al, Thermal Expansion of Nonmetallic Solids, Thermophysical properties of Matter 13, 2 pgs.

Colin T. Taylor et al., Measurement of the thermal Expansion Coefficient of an All-Sapphire Optical Cavity, Apr. 1997, IEEE Transaction on Instrumentation and Measurement, pp. 183-185.

Alexander Zaitsev, Chapter 7 Handbook of Industrial Diamonds and Diamond Films, Optical Properties, pp. 231.

* cited by examiner

Figure. 2. Net area conducting heat efficiently across the interface between the Ti:sapphire and the diamond decreases with radial position. Gap areas are filled with material having reduced thermal conductivity, but similar optical properties.

SOLID STATE LASER MEDIUM AND LASER MEDIUM HEAT TRANSFER METHOD

CROSS-REFERENCE TO RELATED APPLICATIONS

This application claims priority to U.S. Provisional Application 60/567,089, filed Apr. 30, 2004.

FEDERALLY SPONSORED RESEARCH OR DEVELOPMENT

The research underlying this invention was supported in part with funds from the United States Department of Defense, under grant numbers W911NF-04-1-0097, DAAD19-02-1-0073 Mod P0001, DAAD19-03-1-0281, and DAAH01-01-C-R160; and the National Aeronautics and Space Administration, under grant number NCC8-200. The United States Government may have an interest in the subject matter of this invention.

FIELD OF THE INVENTION

The invention relates to heat transfer for solid state lasers and, more particularly, to thermal interfaces between a solid state laser element and a thermal conduction element and thermal interfaces that may be located within the solid state laser medium.

BACKGROUND OF THE INVENTION

Optically pumped lasers convert pump energy at a pump wavelength into a coherent electromagnetic wave ("laser energy") at a second wavelength either as a free running laser oscillator, or under control of an input signal as a laser amplifier. A primary goal of laser operation is maintaining laser oscillator action. This requires a threshold pump level and an upper limit on the degree of thermally induced distortion of the optical properties of the laser gain material. It is a further goal to maintain the laser oscillator action with good beam quality. This requires a yet more complete removal of sources of optical distortion of the gain material.

Pump energy that is absorbed and not converted into laser energy becomes heat and must be removed from the laser. The heat generated in connection with the laser action typically becomes larger as the laser power is increased. Eventually, with increasing laser power, the distortion caused by this increasing amount of heat degrades beam quality and will, at sufficiently high power levels, reduce or eliminate the laser oscillator action entirely. This is the primary mechanism that limits the scaling of laser oscillators and amplifiers to high power.

In a conventional pumped laser configuration, the gain medium is configured as a rod, in which the length of the rod is larger than the diameter of the rod. Typically, pumped lasers are surface cooled, that is, heat is conducted away from the surface of the pumped laser gain medium, where side heat removal is relied upon to achieve the heat transfer. Surface cooling results in thermal gradients within the gain medium with a temperature increasing with decreasing radial position relative to the center of the rod. These thermal gradients are necessary for removing the heat generated in the laser material, but introduce several disadvantages from a materials standpoint and, more importantly, increase laser distortion. Therefore, simple surface cooling of a gain medium is inadequate for high-power lasers, such as those currently under consideration for transforming sunlight in space to highly coherent light and transmitting that light safely to Earth and other locations in space at high power levels. These problems occur to some degree in virtually all solid state lasers operating at average powers above a few watts.

More recently, it has been found that a high-power gain medium may be more adequately cooled by having the laser gain media sandwiched between pairs of optically transparent materials having high thermal conductivity. This provides an increased level of cooling of the interior of the laser gain media and reduces the distortion caused by over heating of the laser gain media. However, for optimum high-power laser performance, such as sought for lasers proposed for transferring energy from space, or other applications requiring less average power, the gain media still produces unacceptable distortion, even with the sandwiched high thermal conductivity material.

It is desired to provide a solid state laser medium capable of providing adequate cooling to the gain medium at high-power operation in order to reduce or eliminate thermal induced optical distortion.

SUMMARY OF THE INVENTION

The invention is a solid state laser medium comprising at least one thermal conduction element, i.e. cooling element, in contact with and alternating in series with at least one laser gain element. At least one cooling element and at least one gain element are joined at an interface having a center point, wherein the interface is physically modified at the interface such that the heat transfer coefficient at the interface decreases radially from the center point of the interface. Upon excitation, and the associated heating, of the gain element, the modified interface promotes thermal transfer from the gain element in the axial direction, in such a manner as to reduce thermal distortion affecting optical properties of the laser, such as thermal lensing and stress induced birefringent loss, to the levels required to achieve the needed average power and high beam quality.

The laser gain material may be any of the laser gain materials known to those of ordinary skill in the art, such as Ti:sapphire, Nd:YAG, or Nd:YLF.

The cooling element is a thermal conduction element, such as a diamond or undoped sapphire disk. Diamond has thermal conductivity, thermal expansion, and minimal change in refractivity with respect to temperature (thermo-optic coefficient) suitable to remove heat from the solid state laser while minimally affecting optical properties of the laser optical field. Single crystal diamond may be preferred over polycrystalline diamond due to scattering losses of the latter, however improvements in diamond technology may improve polycrystalline diamond for use with the invention. Undoped sapphire, as well as other thermal conduction mediums known in the art, is also known to have particularly favorable thermal and optical properties that facilitate service as a cooling medium.

The cooling element and gain element are in thermal communication facilitating heat transfer from the gain element material to the cooling element. According to an advantages embodiment, one cooling element is in thermal communication with a first side of the gain material, while a second cooling element is in thermal communication with a second side of the gain material. The overall structure is configured so that the laser gain material, e.g. Ti:sapphire, exhibits heat transfer primarily in the axial direction, i.e. along a longitudinal axis parallel with the optical axis of the laser medium. Upon reaching the cooling element interface, heat crosses the interface into the cooling element. The heat transfer coefficient of the interface varies radially from the centerline of the interface due to the variation of the effective heat transfer coefficient designed to decrease radially from the center of the interface to the outer edges of the laser medium. The resulting thermal gradient is therefore primarily radial through the cooling element causing heat to be conducted radially outward toward a circumferential thermal reservoir or heat sink. In order to favor axial thermal heat transfer through the gain material, the gain material is advantageously insulated about its circumferential perimeter from any potential heat sink.

The heat transfer properties between the laser gain material and the conduction element are dependent upon the physical, molecular, atomic, and geometric heat transfer properties of the interface itself. The preferred variation of the interface heat transfer coefficient with radial location is one in which the heat transfer rate across the interface decreases with increasing radial distance from the optical axis. Therefore, one method to achieve a decreasing mean heat transfer area includes having a larger effective surface contact area at the center and decreasing that contact area radially toward the perimeter of the interface between the thermal conduction element and the laser gain material. The contact areas between the elements may be established by etching the surfaces to create gaps and contact surfaces through well known etching and other structural dimensioning techniques.

The spatially varying heat transfer coefficient, while necessarily having a strong influence on the heat flow, should have minimal effect on the optical fields of the laser. This is possible given the very substantial differences in the manner in which heat and light interact with the gain material and the cooling material. In particular the characteristic wavelengths of the optical field and the thermal excitations are substantially different with the former typically being much larger than the latter. The structuring of the variations in the interface are large enough to influence the heat transfer, but sufficiently small, or otherwise configured, so as to have minimal influence on the transmitted optical fields of the laser.

According to one embodiment of the solid state laser medium, a plurality of laser gain layers and cooling layers are alternated in series to form a single integrated laser medium, such as an elongate cylinder. The invention is not limited to disk or cylinder shapes, and other shapes may permit alternating layers of diamond and solid state lasing element to form an integrated diamond solid state laser gain medium. Cooling materials other than diamond, such as undoped sapphire, may also be used. Each end of the cylinder includes a cooling element. The placing of cooling elements at either end and making them half the thickness of the gain elements, tends to assist in achieving the goal of a uniform radial temperature distribution in the gain disk. The cooling elements are advantageously disposed at each end of the laser medium in contact with the final gain elements in the alternating series The preferred aspect ratio of the laser gain material tends to be disk like because removing the heat out of the gain element in an axial direction has minimal negative effect on the beam quality. By making the gain element disk-like the path to remove heat in the axial direction is relatively short and by keeping the periphery of the disk shaped gain element out of contact with a thermal reservoir (insulating it) this axial direction of flow is favored.

The aspect ratio does not have to be disk like, but the less disk like the element is the further the heat has to flow in the axial direction before it can leave the gain element. This will tend to create large axial gradients in temperature. Qualitatively speaking laser modes tend to be long and slender and heat removal tends to be easiest when one keeps the path as short as possible. This tends to favor a rod like gain medium with outward radial flow of the heat to be removed. By introducing multiple "unit cells" where the "unit cell" is one gain "disk" and one cooling "disk" and arranging them as illustrated herein one gains the rod like geometry and a removal of the heat in the preferred short axial direction, but a "net" gain medium that does not have a "net" variation in refractive index in the radial direction and also does not have a "net" birefringence or other complication of the susceptibility that causes it to differ significantly from the susceptibility of a simple spatially uniform medium.

According to another embodiment, thermal barriers to radial heat flow may be introduced within the gain medium. These thermal barriers are designed to have minimum influence on the transmitted optical laser field. In other words, the thermal gradient in the gain laser material is primarily axial due to the decreasing mean heat transfer area and insulation and the additional thermal barriers to radial heat flow within the gain element. The thermal gradient across the cooling element is primarily radial with the temperature decreasing with increasing radial location relative to the center of the cooling element that coincides with the optical axis due to the thermal heat sink disposed radially about the cooling element and the preferential introduction of heat near the center of the cooling element.

In general, it has been found that a favorable laser oscillator gain region design tends to produce more heat near the optical axis than at locations removed in an outward radial direction from the optical axis. In such a case it may be desirable to assist the minimization of optical distortion by introducing radially disposed barriers to heat flow that hinder heat flow in the radial direction within the gain disk. An example would be that of a gain disk of Ti:sapphire and a cooling disk of undoped sapphire. Here the choice of radially disposed barriers to heat flow in the radial direction and choice of a radially varying barrier to heat flow across the interface between the Ti:sapphire disk and the undoped sapphire cooling disk (oriented normal to the optical axis) would be designed to produce similar, but oppositely signed, temperature variations. The goal is reduction of the net optical power and net optical birefringence of the composite element to the point of negligible undesirable influence on the optical fields of the laser.

Temperature gradients in the z direction will necessarily be present in both the gain material and the cooling material as a means of causing heat to flow out of the gain material and into the cooling material. These temperature gradients will be relatively unimportant as regards causing optical distortion to the transmitted laser fields since these gradients will be oriented primarily in the direction of propagation of the laser field. Some differences in the net optical path at different radial positions may be caused by the contribution of these gradients averaged over the axial dimension of the gain and cooling elements. The contribution of these gradients and the radial gradients to a net thermally induced change in the optical path length at a given radial position is advantageously considered in designing the various interfaces. The overall design goal is to so influence the heat flow under representative operating conditions as to cause the net undesirable optical distortion experienced by the laser field on propagating through the combined gain and cooling elements to be negligible.

The particular choice of the interface properties is determined by the relationship of the distribution of the waste heat produced in the gain medium and the dimensions of the gain and cooling elements. The set of radially disposed interfaces in the gain element, which are typically chosen to hinder heat transport across the interfaces, and the radial variation of the interface heat transfer coefficient between the gain and cooling elements are optimally chosen so that the net thermally induced optical changes in the basic pair of gain and cooling materials cancel. Computer simulations and mathematical calculations show that this strategy can be accomplished in such a way that the thermal lensing induced in the gain element has a similar radial dependence and magnitude as the thermal lensing induced in the cooling material, but an opposite sign. This results in an absence of net thermal lensing in the pair of gain and cooling materials. If the two materials are substantially the same, as Ti:sapphire and sapphire, the induced birefringence will typically also be cancelled. If the two materials are different as Ti:sapphire and diamond the thermally induced birefringence will typically be reduced when the thermal lensing is so corrected, but will typically not be reduced by the same magnitude. An exception is the case where a specific operating temperature may be found where both thermal lensing and induced birefringence are both similarly cancelled at a particular operating condition.

According to another embodiment, the interfaces may be cut at Brewster's angle, the angle at which polarized light reflection is minimized, to maximize optical transmission therethrough.

The preferred embodiment of the invention is represented in the core concept of a "unit cell" consisting of a gain element and a cooling element that when organized into a series of unit cells produces the needed net outward heat flow, but negligible optical distortion as perceived by the transmitted optical field and also sufficiently low stress in any given element so as to avoid stress fracture of the material. One reason for minimizing the radial gradients in the gain element is to avoid this stress fracture. Stresses within the unit cell may be effectively managed and manipulated by lengthening increasing the number of unit cells to match the desired power output, etc., of the laser. This reduces the amount of heat that any given cooling disk must remove and hence reduce the radial temperature gradient in that gain element and hence allows one to always get below the stress fracture limit by simply lengthening the overall laser medium. The laser medium may be lengthened because the unit cell introduces approximately zero optical power and approximately zero depolarization of the optical field, resulting in scalability that was previously unavailable.

The invented laser medium influences and essentially selectively impedes the radial heat flow in the laser gain medium. The optimized reduction in radial heat flow allows a pump to deliver more power to the central region of the gain medium near the axis, i.e at small radial distance from the optical axis of the laser resonator while still obtaining a substantially zero net optical distortion for the combined gain and cooling elements With the present invention, waste heat may be successfully removed from the gain medium while keeping the thermal stress, thermal shock, and thermal stress induced birefringence of the laser medium at a minimal level.

BRIEF DESCRIPTION OF THE SEVERAL VIEWS OF THE DRAWINGS

Figure 1:
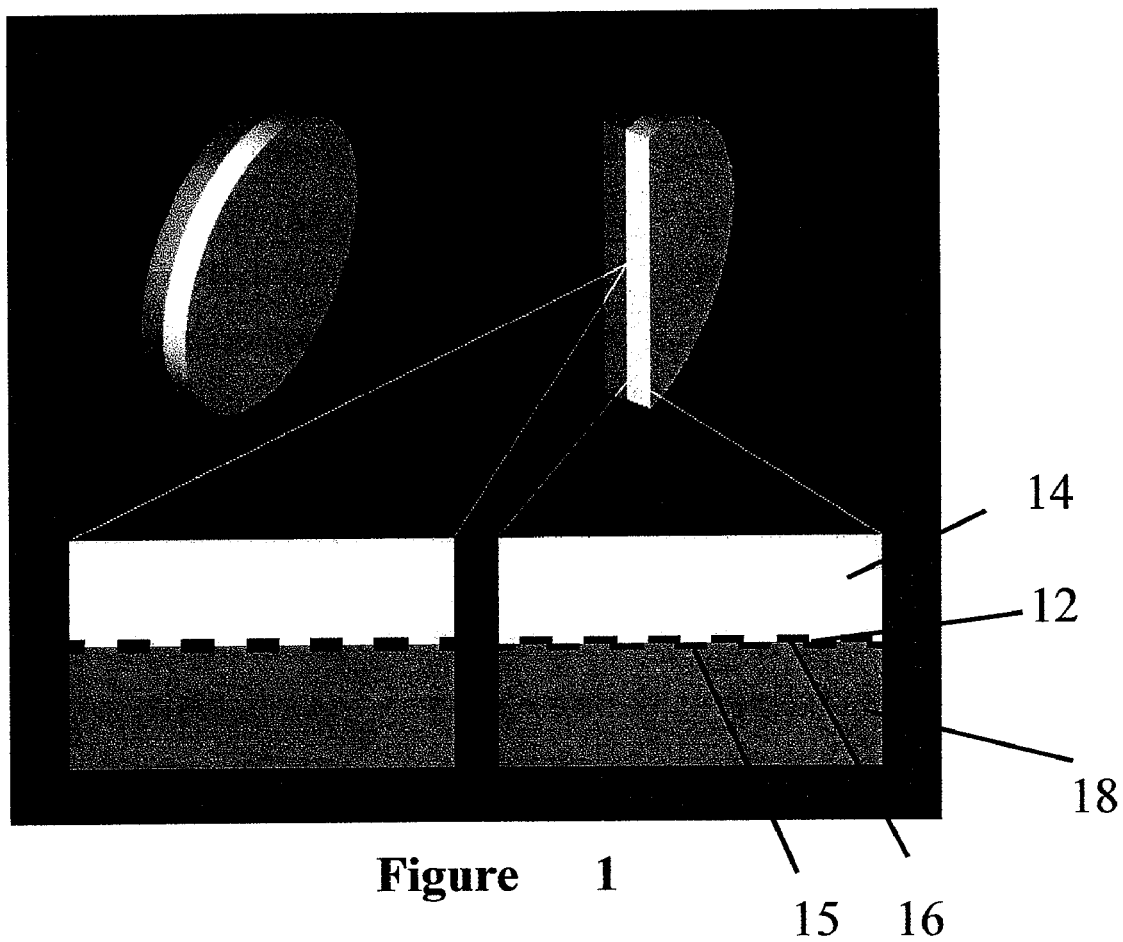
Figure 2:
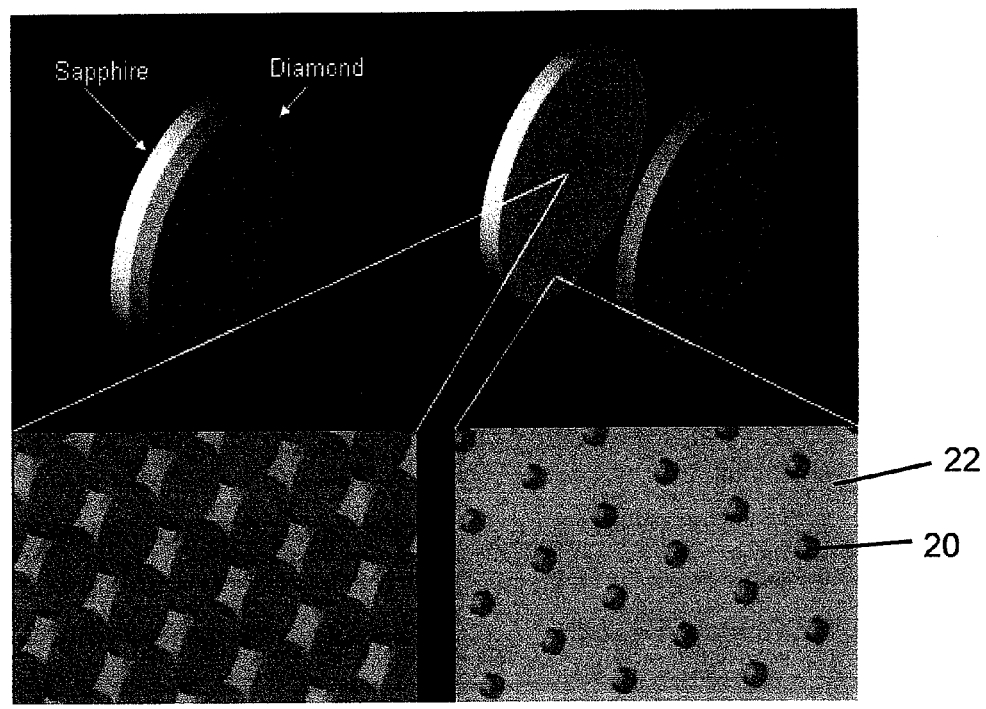
Figure 3:
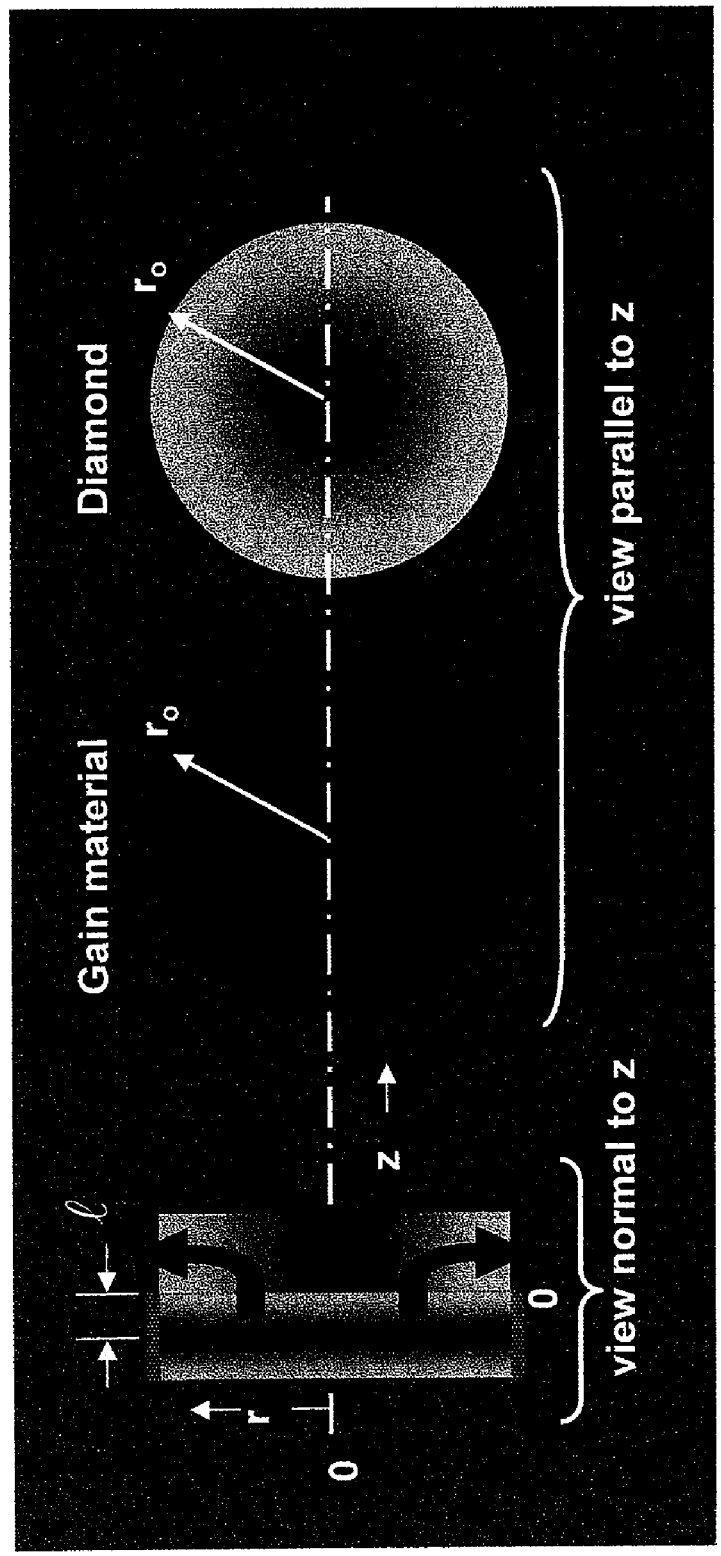
Figure 4:
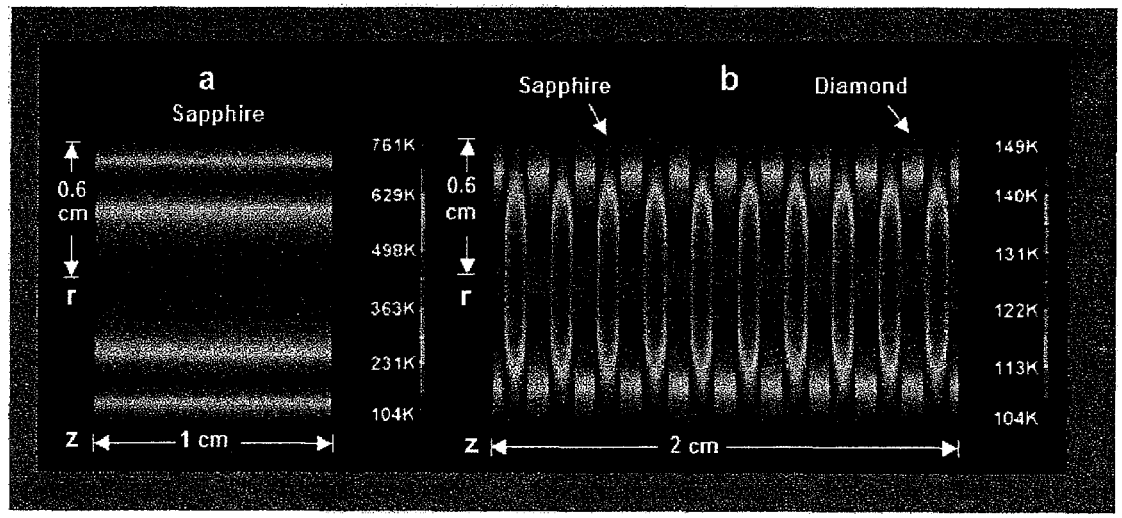
Figure 5:
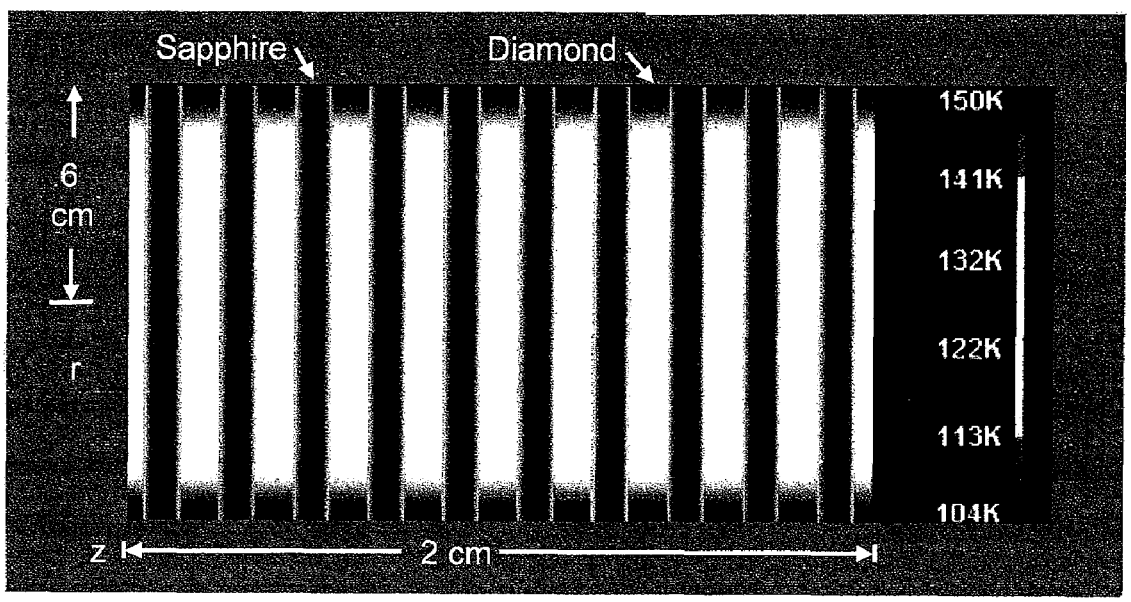
Figure 8:
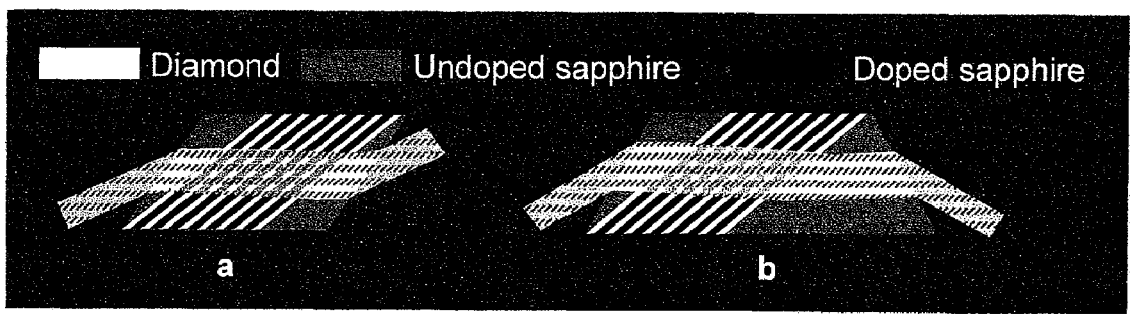
Figure 6:
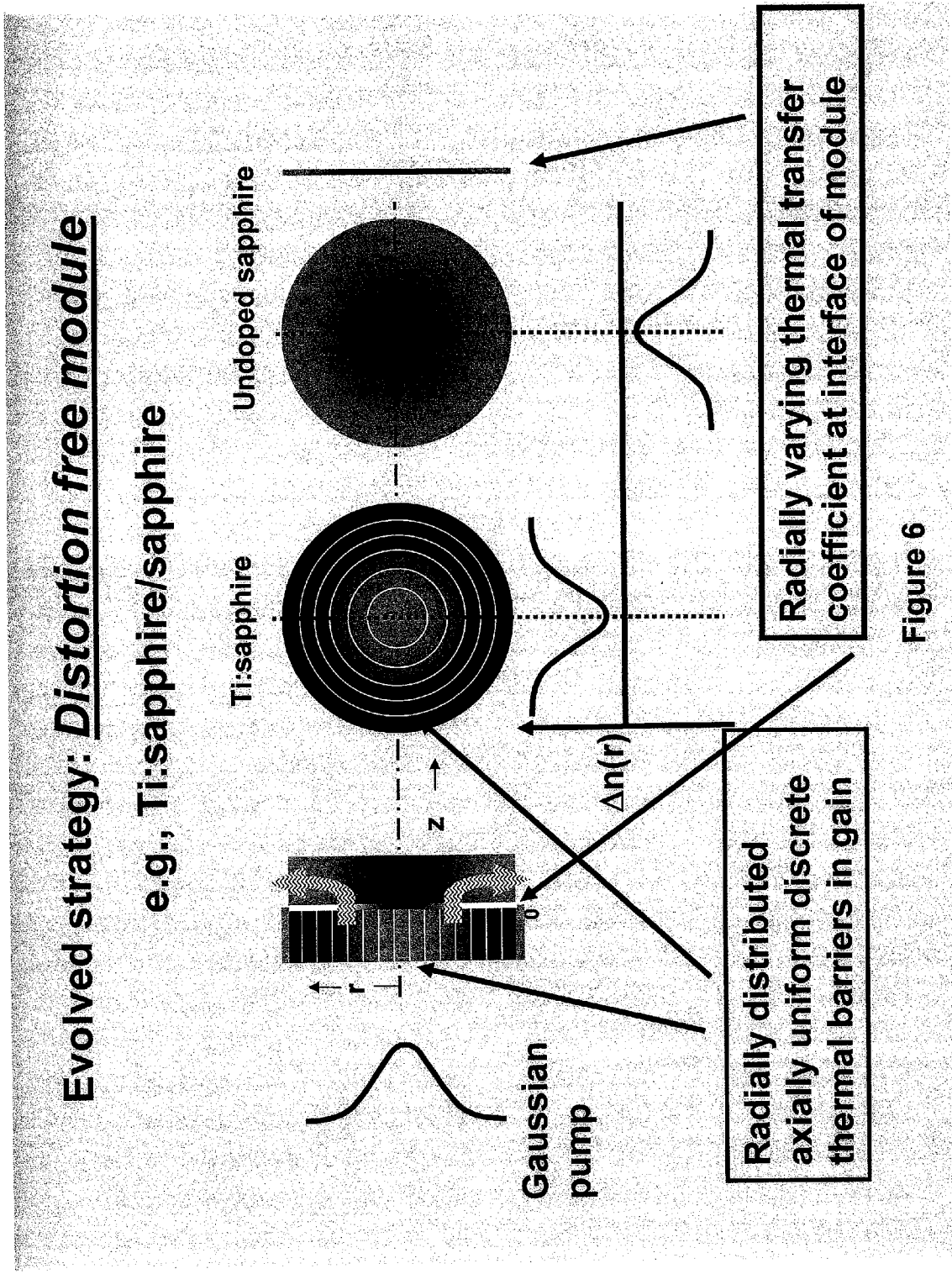
Figure 7:
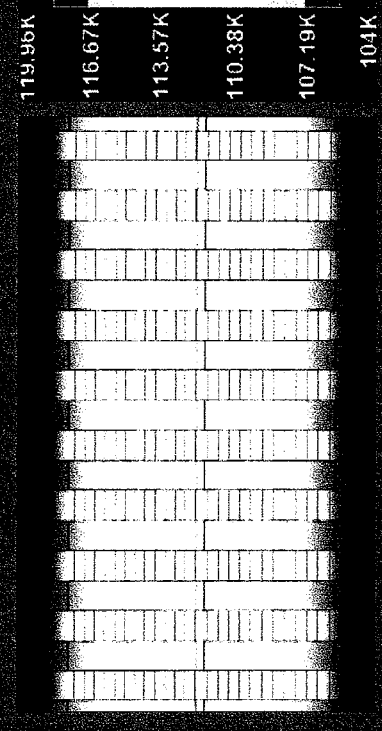

Having thus described the invention in general terms, reference will now be made to the accompanying drawings, which are not necessarily drawn to scale, and wherein:

FIG. 1 is a combined perspective and side view of an interface between a laser gain element and a cooling element in accordance with an embodiment of the invention;

FIG. 2 is a second combined perspective and side view of an interface between a gain element and a cooling element in accordance with an embodiment of the invention;

FIG. 3 is a schematic showing the heat transfer profile of a gain element and cooling element according to an embodiment of the invention;

FIG. 4 is a thermal profile of a Ti:sapphire:diamond layup wherein the media interfaces have not been modified;

FIG. 5 is a thermal profile of a Ti:sapphire:diamond layup wherein the media interfaces have been modified in accordance with an embodiment of the invention;

FIG. 6 is a combined side and front cutaway view of the thermal profile of a Ti:sapphire:sapphire layup having radially disposed barriers to radial heat flow in the Ti:sapphire and a radially decreasing heat transfer coefficient between the Ti:sapphire and undoped sapphire disks in accordance with an embodiment of the invention;

FIG. 7 is a cutaway thermal profile of a Ti:sapphire:sapphire layup having an optimized combination of radially disposed barriers to heat flow in the Ti:sapphire and a heat transfer coefficient between the Ti:sapphire disk decreasing with increasing radial distance from the optical axis in accordance with an embodiment of the invention; and FIG. 8 is cross-sectional view of a solid state laser medium incorporating Brewster angles in accordance with an embodiment of the invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1 and according to one embodiment of the invention, a solid state laser medium comprises alternating layers of a solid state laser gain element 16, for example, Ti:sapphire, and a cooling element 14, for example single crystal diamond or undoped sapphire. The layers 14, 16 mate at an interface 30, said interface 30 having a center point at or near the optic axis of the laser medium. The surface regions of the gain element and/or the cooling element are physically modified at the interface 30 such that the heat transfer coefficient at the interface 30 decreases radially from the center point/The surface regions are advantageously modified at the interface such that the heat transfer coefficient decreases radially in a manner that minimizes the undesirable net optical distortion caused to the laser field by the combined gain and cooling media. Barriers to radial heat flow within the gain element may also be introduced to achieve the optimum minimization of the net optical distortion caused by the thermal gradients in the gain and cooling elements.

The purpose of the invention is to minimize the undesirable net optical distortion caused to the transmitted laser field due to the combined action of the gain and cooling media by influencing, essentially selectively impeding, the heat flow across the interface between the gain and cooling media and also selectively impeding the heat flow in the gain element in the radial direction.

One method of reducing net optical distortion in accordance with the invention is to keep the variation in the net optical path delay produced by the combined action of the gain and cooling elements with radial position small by keeping the radial variation in optical path delay of both the gain and cooling media small, as by maintaining a temperature in the gain element that is approximately independent of radial position and also a variation in the refractive index in the cooling element with radial position small by virtue of the high thermal conductivity and small thermo-optic coefficient of the cooling element, such as diamond. Precise cancellation of the distortion can be produced by small adjustments in the radial dependence of the temperature in the gain element in such a case.

Another method of reducing net optical distortion in accordance with the invention is to allow relatively large variations in the temperature in both the gain element and the cooling element, but to so design these temperature variations that the net optical distortion produced by the combination of the gain and cooling elements is approximately zero. By this means the net thermal lensing and thermal stress induced birefringent loss can be reduced or largely eliminated. In addition, thermal shock can typically be made unimportant by a sufficiently large increase in the length of the overall composite gain element formed of a sufficiently large number of pairs of these combined gain and cooling elements. This increase in the overall length of the entire gain element is normally not an option, but is allowed in the case of our invention because the cancellation of optical distortion for each pair of gain and cooling elements permits substantially larger increase in the overall length of the gain element than would otherwise be possible.

For the first time, it has been demonstrated that the temperature in the gain element may be maintained largely independent of the radial position by physically modifying the surfaces of the gain element and/or cooling element at their interface such that the heat transfer coefficient at the interface decreases radially from the center point. By using these techniques, particularly by modifying the heat transfer coefficient in a specific manner, a laser medium may be constructed that is essentially a distortion corrected module, wherein distortion is reduced or cancelled out.

Also for the first time, a similar cancellation of net optical distortion caused by the pair of gain and cooling elements has been demonstrated. This is achieved by allowing relatively large temperature variations in the gain element and also in the cooling element, as by designing the particular temperature variations to have approximately opposite variation with radial position so that the optical path delay produced by the pair of gain and cooling elements exhibits a sufficiently small net variation with radial position.

The surface regions of the gain element and/or cooling element may be modified in a number of ways to provide a heat transfer coefficient at the interface that decreases radially from the center point. The key is to make the interface appear to be absent to the light, but dramatically and forcefully present to the heat. A general strategy is one of using the relatively long wavelength of light to cause it to "average" over the modifications at the interface while the short wavelength of the heat (lattice phonons) causes the transfer of heat to be affected by the local modifications at the interface.

For instance, the interface may be etched so as to provide contact areas of material that will provide heat transfer between the diamond and Ti:sapphire. The contact areas of material may be constructed on either the gain element or the cooling element, or both. For example, still referring to FIG. 1, contacts areas 12 are raised up from one surface 14. The contact areas 12 overlap with contact areas 16 on the opposed surface 18. Gaps 15 between the contact areas represent areas of negligible heat transfer, and additional insulative materials having a refractive index closely approximating that of either the cooling material or the gain material may be employed to fill these gaps. At the interior of the surface 14 the contact overlap is greater, and the overlap decreases radially as a function of the desired heat transfer coefficient. Again, the contact areas may be etched onto the surface of either the gain element or cooling element, or both. In general, to avoid introducing loss these variations in contact area, or effective contact area, will need to have minimal differences in optical properties, or be so small compared to the optical wavelength and so disposed in position, as in a photonic crystal type of design, that the undesired influence on the transmitted optical fields is minimized.

Another example of gain media or cooling media surface modification is to grow epitaxially a thin layer of material, for instance GaAs on sapphire, and then configure the material at the interface and using a regular pattern of holes in the epitaxial material to create "empty spaces" that will not conduct heat, but which are so small, and so regularly distributed, that the light is not affected by the holes, or at least averages over their influence so that the so configured epitaxial material seems to the light to have net properties that are indistinguishable from the sapphire host.

The contact areas are structured to maintain uniform optical properties across the gaps by keeping the width of the gaps less than the wavelength of the light traveling across the interface. The gaps may be filled with a material having the same or substantially similar refractive index as either the gain element or the cooling element, but the material should have a much lower effective thermal conductivity so as to introduce the desired variation in heat transfer coefficient as a function of radial position along the interface.

While the structure of the interfaces is indicated for purposes of illustration it is important to avoid optical loss and scattering. Consequently, the variations in the interface that are introduced to alter the heat transfer rate are intended to have dimensional changes that are either small or large compared to an optical wavelength so as to minimize optical distortion and loss. In some cases, regular, and properly designed, variations of the order of an optical wavelength could be useful. Also compensating variations are intended to be introduced in such a way that the desired variation in thermal heat transfer is achieved while at the same time leaving the net optical properties of the integrated gain element largely unaltered.

The materials of the gain element and cooling element have different amounts of thermal expansion on either side of the interface because of the differences in temperature. Therefore, the layers are advantageously bonded with adhesive free bonding. Adhesive free bonding creates a quasi-bond, typically with Van der Walls forces, that "slips" but nevertheless retains good thermal contact between the two materials. Adhesive free bonding is a demonstrated phenomenon in the art of laser media. Alternatively, an adhesive bond could be used provided such a bond did not adversely affect the optical fields or result in an unacceptable limit on the optical power as caused, e.g., by optically induced degradation of the bonding material.

It is desirable that any distortion be minimized or corrected before it gets too large. Therefore, the gain media and cooling media are preferably relatively thin in the direction along the optical axis. In general, the individual gain and cooling elements will tend to have a disk-like aspect ratio with this ratio tending to become more disk-like as the total power produced by the laser system is increased.

According to a first main embodiment of the invention, net optical distortion and net stress induced birefringent loss are reduced to a negligible level by using a cooling element that is dissimilar to the gain element, i.e. not merely an undoped version of the gain element. Diamond is the preferred cooling element under this embodiment because diamond has thermal conductivity multiple orders of magnitude greater than most gain materials. Undoped sapphire can also be used, as in the case of Nd:YAG:sapphire, with the performance tending to improve with decreasing temperature down to ~30 K.

In one embodiment of a solid state laser medium, shown in FIG. 3 (only one diamond layer shown), Ti:sapphire disks alternate in series with diamond disks and diamond disks disposed on each end, and the end diamond disks may be one half the width of the other diamond disks to assist in producing a uniform temperature distribution. Each of the diamond disks is connected to a thermal reservoir to permit radial flow of heat through each disk toward the outer edges of the disk. The Ti:sapphire disks are insulated at the outer edges to minimize radial heat transfer gradients in the laser gain material so that heat flows axially toward the diamond disk. One may still see radial heat flow despite this insulation as discussed above. This is not necessarily a big problem and can in some cases be used to advantage. The main point is to reduce the radial temperature gradient in the gain disk.

According to a preferred variation of the first embodiment, when the optical distortion is reduced, such as with use of a diamond cooling element, the interface between the gain element and the cooling element, is advantageously prepared so as to exhibit a heat transfer coefficient that is radially dependent, as described by equation (1):

$$h(r)=\gamma_0 l/[\Delta T_{ds0}+\gamma_0 r^2/(4\kappa_d)] \quad (1)$$

where h(r) is the heat transfer coefficient measured in Watts/cmK, $\gamma_0$ is the heat input in Watts/cm³, 2 l is the thickness of the Ti:sapphire, $\Delta T_{ds0}$ is the temperature difference between the Ti:sapphire and the diamond at r=0, r is the radial distance from the optical axis at the center of the gain rod, and $\kappa_d$ is the thermal conductivity of the diamond. The equation is derived and further explained in the article "Integrated Diamond Sapphire Laser," by Richard L. Fork et al published in Optics Express, Vol. 11, No. 20, 6 Oct. 2003, the body of which is incorporated herein by reference to the extent it does not conflict with the instant disclosure.

When the surfaces of the gain element and/or cooling element are prepared at the interface to comply with equation 1, the radial temperature profile of the gain medium approaches a theoretical uniformity for the particular case of radially uniform generation of waste heat. Since the heat transfer coefficient can be decreased by decreasing the contact area at the interface, the radial dependence described by equation 1 could be achieved by selectively maximizing the contact area at z=0 and r=0 and then decreasing the mean contact area at the interface as a function of radial position, while otherwise minimally altering the optical properties of the interface. For a distribution of waste heat that is different from uniform, e.g., cylindrically symmetric, but not radially uniform the radial direction the variation in the heat transfer coefficient would optimally be changed so that the net induced optical distortion would be negligible for this differently distributed heat load.

FIG. 2 illustrates an embodiment of the invention where the contact areas 20 on a surface 22 are radially dispersed as a function of the desired heat transfer coefficient from equation 1.

FIG. 4 illustrates a thermal profile of a laser medium with alternating gain media and cooling media, here Ti:sapphire and diamond. As seen in the profile, the diamond material does act to transfer heat radially from the laser medium, but leaves a buildup of heat at the center of the gain medium. Referring to FIG. 5, by modifying the surfaces of the gain and/or cooling media at the interfaces, heat transfer from the gain material is controlled such that heat transfer decreases radially, resulting in a more uniform temperature in the gain material.

According to a second main embodiment, overall optical distortion and stress are reduced to a negligible level by using a cooling element that compensates for distortion in the gain element with nearly equivalent distortion, but of opposite sign, in the cooling material. Use of doped/undoped materials is favorable since they have the same coefficients of thermal expansion and thermo optic coefficients over the temperature range of interest, i.e. use temperature. Using doped and undoped varieties of the same material achieves a compensation of the thermal lensing and the stress induced birefringence in the gain material by a similar, but opposite thermal lensing and opposite stress induced birefringence in the cooling material. Compensation is best accomplished by using an undoped variety of the gain material, such as a Ti:sapphire:sapphire layup. An exemplary Ti:sapphire:sapphire layup is shown in FIGS. 6 and 7 below.

An advantage of the second embodiment is that the cooling element has substantially the same refractive index as the gain element. In this case of the similar but undoped embodiment, it is not necessary to configure the interface between the gain and the cooling media at a Brewster angle with respect to the optical axis since there is no index discontinuity at the interface. There will still be a need to provide a Brewster angle interface at the locations where the optical field enters or leaves the overall integrated assembly of gain and cooling disks, as into vacuum or air. This does simplify the construction of the overall gain element which otherwise would typically require one Brewster angle interface on entering or leaving the integrated assembly and another differently oriented Brewster angle surface at the interface between the two different materials composing the gain and cooling disks.

According to another embodiment of the invention, concentric radial heat barriers may be incorporated into the gain element in order to further prevent radial heat transfer in the gain element. The additional barriers to radial flow in the gain element allow one to "force" virtually all the heat flow, despite a radial variation in the excitation energy, axially into the cooling element and then radially outward through the cooling element. The use of radial flow barriers in the gain element is particularly useful in embodiments having cooling media that are similar but undoped varieties of the gain media, such as a Ti:sapphire:sapphire layup.

Referring to FIG. 6 (only one Ti:sapphire and one sapphire layer shown), Ti:sapphire disks alternate in series with undoped sapphire disks and undoped sapphire disks disposed on each end, and the end undoped sapphire disks may be one half the width of the other undoped sapphire disks to assist in producing a uniform temperature distribution. Each of the undoped sapphire disks is connected to a thermal reservoir to permit radial flow of heat through each disk toward the outer edges of the disk. The Ti:sapphire disks are advantageously insulated at the outer edges to minimize radial heat transfer gradients in the laser gain material so that heat flows axially toward the diamond disk. Radial heat barriers are disposed within the Ti:sapphire media, concentrically arranged around the center line, i.e. optical axis, of the gain media.

Referring to FIG. 7, the temperature profile of a Ti:sapphire:sapphire layup is shown. According to this embodiment, radial heat barriers within the gain media and surface modifications at the interfaces of the gain and cooling media may be correlated to relatively uniform temperature within the center of the laser medium, i.e. proximate to the optic axis, resulting in minimization of thermal lensing and thermal stress induced birefringence.

According to a particularly preferred variation of the second embodiment, a gain module structure is provided having a generation of heat concentrated in the laser gain medium toward the center (typically a Gaussian distribution). The circumference of that gain element is made hotter than the core by a significant margin comparable to the difference between the core and the circumference of the cooling element so as to correct the net distortion of the composite gain/cool element. The natural tendency of the gain element to cause inward heat flow is forcefully inhibited using the radially disposed barriers to radial heat flow in the gain element and also decreasing the heat transfer across the interface between the gain element and the cooling element with increasing radius.

As with the preferred variation of the first embodiment, this preferred variation of the second embodiment may be modeled mathematically to obtain the theoretical desired temperature profile by controlling the flow of heat between the elements. Describing doped/undoped materials in general, but using Ti:sapphire:sapphire as a particular example, this can be accomplished by changing h so that the temperature in the Ti:sapphire is opposite of the temperature in the sapphire. The departure from the medium temperature in the Ti:sapphire along r is given by, $$\Delta T_T(r) = \Delta T \left( 1 + \alpha \frac{r^2}{r_o^2} + \beta \frac{r^4}{r_o^4} \right),$$

and the departure from the medium temperature in the sapphire along the radius r is given by $$\Delta T_S(r) = -\Delta T \left( 1 + \alpha \frac{r^2}{r_o^2} + \beta \frac{r^4}{r_o^4} \right),$$

where $r_0$ is the radius of the material and $\Delta T$ is half the difference between the minimum temperature in the Ti:sapphire and the maximum temperature in the sapphire. The heat equation in radial coordinates, $$\frac{d^2 T}{dr^2} + \frac{1}{r} \frac{dT}{dr} + \frac{\gamma(r)}{K} = 0$$

where K is the conductivity of the material and $$\gamma(r) = \gamma_o \left( 1 - \frac{r^2}{r_o^2} \right)$$

where $\gamma_0$ is the power density can be used to find alpha, $$\alpha = \frac{\gamma_o r_o^2}{4K},$$

and beta, $$\beta = -\frac{\gamma_o r_o^2}{16K}.$$

After inserting these back into $\Delta T_T$ and $\Delta T_s$ we get $$\Delta T_T(r) = -\Delta T_S(r) = \Delta T_o \left( 1 + \frac{\gamma_o r^2}{4K} - \frac{\gamma_o r^4}{16 K r_o^2} \right).$$

Finally, we are able to specify $$h(r) = \frac{\gamma(r) l}{|\Delta T(r)|} \quad (2)$$

where l is the length of the element and $\Delta T(r) = |\Delta T_T(r)| + |\Delta T_s(r)|$ Here $\Delta T_o$ is the temperature difference at r=0 under steady state heat flow given the assumed waste heat density at r=0 and the heat transfer coefficient between the gain element and the cooling element at r=0 in the absence of the proposed modifications that decrease the rate of heat flow at the interface for r>0.

The choice of the distribution of the pump power, in the radial direction in particular, will, in general, be a factor in determining the reduction or cancellation of the optical distortion. The preferred radial variation of the heat transfer coefficient for a given radial pump power distribution can be discerned for a given embodiment through application of standard computer simulations and analytical calculations that instruct as to the particular relationship of those distributions that yield the desired net cancellation of the induced optical distortion.

The barriers to radial heat flow and the heat transfer coefficients at the interface between the gain element and the cooling element can be adjusted for any given distribution of pump power. In general all these cases will have cylindrical symmetry so that the adjustments can be made relatively simply as variations in the radial properties of the pump power and heat transfer coefficients. As a result, net thermal lensing, net thermal stress induced birefringent loss can be reduced to an acceptably low level in a wide variety of combinations of pump distribution, and gain and cooling materials by use of the radial heat barriers in combination with the modified surfaces at the interface.

Thermal shock can be kept acceptably low by increasing the length of the integrated gain element as needed. This is possible, and typically only possible, because the design of the individual gain and cooling pairs of elements has kept the accumulated net thermal lensing and accumulated net thermal stress induced birefringent loss at an acceptably small value.

These barriers to radial heat flow could be introduced by a method similar to that used to produce the barriers at the interface between the gain and cool elements. A difference occurs in that the optical field will typically be propagating parallel to the barrier rather than normal, or at Brewster's angle to this barrier. In general, this will tend to ease the task of suitably minimizing the influence of the thermal barrier so introduced on the optical field.

One means of introducing these barriers to radial heat flow is through the production of a growth of another material on the surfaces of a series of annuli having progressively increasing radii and so designed as to create a "nested" set of annuli having successive contiguous cylindrically shaped interfaces. The material so disposed on these interfaces could be prepared with arrays of axially oriented holes or introduction of localized regions of different material so structured as to assist in the goal of creating the needed thermal barriers to radial heat flow.

The materials and the geometries of the elements are provided for purposes of discussion and are not intended to limit the scope of the invention. Other geometries, other laser gain materials, such Nd:YAG, Nd:YLF or Yb:YAG, and other thermal conduction elements may be employed embodying the inventive principles discussed herein. The gain material is also, of course, a thermal conduction medium, but the distinction here is that the "cooling" element serves as a means of removing heat in the outward radial direction while the gain element primarily serves to remove heat in the axial direction where the temperature gradient has minimal undesirable impact on the optical field of the laser.

By computer modeling, as through use of the commercial I-deas™ and Advanced System Analysis Program™ (ASAP) software, the most desirable thermal gradients can be determined. From the desired thermal gradients, the thermal interfaces between the cooling elements and the gain elements can be modeled. This is most easily accomplished by modeling a unit cell with a low aspect ratio, thus eliminating the problem of volumetric thermal gradients in geometries having large aspect ratios.

Right circular disks of different refractive index oriented normal to the optical axis would typically produce unacceptable reflection losses for a laser oscillator. This problem is avoided by constructing the gain medium so that a linearly polarized laser field encounters each interface between different materials and each interface between a material and the surrounding space at Brewster's angle. We illustrate such gain elements in FIG. 8. Another option is the use of anti-reflection coatings at each of the interfaces. In general, such anti-reflection coatings will complicate the design and optimization of the interface properties as well as introduce vulnerabilities to damage at high laser power. While Brewster surface interfaces, or similar materials, are preferred for the gain and cooling elements we do not exclude the possibility of using anti-reflection coatings between those elements in some applications.

The goal of having all interfaces at Brewster's angle and using two different materials calls for structures of the type shown in FIG. 8. The views shown represent a planar cross section taken through the gain element where the intersecting plane includes the axis of the gain element and also the linear polarization vector of the laser field. The various interfaces are oriented so that the linearly polarized laser field always intersects each interface (between different materials, or between material and air) at Brewster's angle. The wedged sections at the ends of each element are needed to satisfy the Brewster angle criterion at both the interfaces between different materials and the interfaces between material and free space.

The complete gain element is regarded here as cylindrical, with the cylinder axis approximately collinear with the direction of propagation of the laser field within the gain element. By way of example, the angular orientations of the interfaces in FIG. 8(a) for the "Brewster" configuration were calculated for diamond and sapphire as the two materials. The laser wavelength was assumed to be 0.8 microns. The difference in index between doped and undoped sapphire is regarded as unimportant. We do not exclude geometries other than cylindrical, but use the cylindrical geometry for our examples as a representing a typical form of embodiment.

This design strategy can be applied to other gain materials and other wavelengths with appropriate changes for the different wavelengths and different refractive indices. The version of the gain element shown in FIG. 8(b) illustrates one strategy that, in effect, combines a prism shape with a parallelepiped shaped gain element so as to provide means for dispersion compensation. A similar consequence, with an additional set of interfaces between the solid state material and air, could be achieved by using a stand alone prism in combination with the gain element shown in FIG. 8(a).

EXAMPLES

Example 1

Representative Ti:Sapphire:Diamond Gain Medium

For the purpose of discussion we consider a representative gain element composed of multiple pairs, e.g., 10, of diamond and sapphire disks. The thickness of the individual disk is sufficiently small, e.g., 1 mm, that the waste heat is removed axially from the Ti:sapphire with a small variation in temperature in the z direction, as discussed above. The number of disks is made sufficiently large to access the net gain, e.g., 0.5%, needed from the gain element. Our goal is to identify a strategy based on this composite gain element that allows testing, in the short term, of the strategy by using currently available resources at moderate average power. We also seek, in the long term, to have this same strategy enable scaling to ~1 megawatt of power from a lowest order Gaussian mode laser oscillator. A number of these gain elements, e.g., 20, can be used within the laser resonator provided the total optical distortion remains within acceptable bounds. We develop here values of key parameters characterizing such a set of gain elements.

For efficient operation the intensity of the stimulating fields $I_{st}$ needs to be larger than $I_{sat}=h\nu/\sigma\tau$. Here h is Planck's constant, $\nu$ is the optical frequency, $\sigma$ is the stimulated emission cross section for the gain transition, and $\tau$ is the excited state lifetime for the upper laser level (for Ti:sapphire $\sigma=4\times10^{-19}$ cm$^2$, $\tau=4\times10^{-6}$ sec and $\nu\sim0.375\times10^{14}$ Hz)). The saturation intensity for Ti:sapphire is consequently $\sim$155 kW/cm$^2$. We will use $I_{st}=4I_{sat}$ for this discussion, or $I_{st}\sim600$ kW/cm$^2$ as a guide.

Example 2

Beneficial Effect of Radially Varying Mean Thermal Transfer Area of the Interface We use finite difference modeling to examine the properties of a structure that approximates an actual gain element. We compare and contrast several gain element designs each performing the same heat dissipation task. One design is that of a conventional cylindrical rod composed solely of Ti:sapphire having a radius of 0.6 cm, a length of 1 cm, and dissipating a uniform density of waste heat 30 kW/cm$^3$ solely through outward flow to the cylinder surface, FIG. 4(a).

A second design is a gain element composed of alternating Ti:sapphire and diamond disks having, at the diamond-sapphire interfaces, a heat transfer coefficient h(r) that is constant with radial position r, FIG. 4(b). The third design is the preferred gain element where h(r) has been given the specific radial dependence derived in Section 2, Eq. 1 for the case of radially uniform generation of waste heat, that yields a temperature distribution in the Ti:sapphire constant with radius, FIG. 7.

The case of Ti:sapphire alone is illustrated in FIG. 4(a). The thermal conductivity of the sapphire near 100 K is large, 4 W/cm-K, but not as large as the thermal conductivity of diamond, 100 W/cm-K. Here we neglect the variation of the thermal conductivity of sapphire with temperature. The large radial temperature gradient implies an unacceptably short focal length thermal lens.

The case of a gain element that integrates diamond with the solid state gain material and has a heat transfer coefficient at the interfaces that is constant with radial position is illustrated in FIG. 4(b). Here we used h$_o$=150 Watts/(cm$^2$-K). The diamond reduces the temperature excursion as compared to sapphire alone. The temperature excursion in the sapphire in FIG. 4(b) is $\sim$27 K as opposed to 660 K as shown in FIG. 4(a).

This reduced radial temperature variation of 27 K in the sapphire of the composite diamond-sapphire gain element is a drastic improvement as compared with sapphire alone. However, given the relatively large dn/dT for sapphire 4.4×10$^{-6}$ K$^{-1}$, vs. 7×10$^{-8}$ K$^{-1}$ for diamond, this structure fails by a factor of some 50× as regards adequately reducing thermal lensing.

Further reductions of the variation of temperature with radial position in the solid state gain material, in this example, Ti:sapphire, will assist in transferring more of the thermal management task to diamond and will further reduce loss and distortion of the optical fields. We show in FIG. 5 a finite difference simulation for a gain element where the radial variation in the heat transfer coefficient, see Eq. (1), is designed to yield a radially independent temperature variation in the gain material.

For this integrated diamond and Ti:sapphire structure designed so that the temperature in the sapphire is constant with radial position, the diamond alone exhibits a radial variation in temperature and consequently the thermally induced shock, lensing, and stress birefringence are those characteristic of diamond. The upper limits on the accessible average power are consequently increased by 4-5 orders of magnitude, or more, as compared to the case of a typical solid state gain material used alone and at room temperature.

Thermal shock in the diamond tends to not be a concern given the extraordinary robustness of diamond against thermal shock. The magnitude of the residual thermal lensing and birefringence effects in diamond at low temperature appears to be sufficiently small to allow total average power of a megawatt as high quality optical fields. Further reductions in the undesirable consequences of the remaining small radial variation of temperature in the diamond may be accessible through compensation strategies or the use of high purity single crystal diamond in the temperature region where the coefficient of thermal expansion passes through zero, $\sim$90 K or through use of isotropically modified single crystal diamond.

Example 3

Ti:Sapphire Undoped Sapphire, Gaussian Heat Distribution, with Barriers to Radialy Heat Transfer in the Gain and Decreasing Heat Transfer Rate Between Gain and Cooling Elements with Increasing Radial Distance from the Optical Axis In general the distribution of waste heat that corresponds to the most efficient amplification of the preferred lowest order Gaussian mode of the laser field will be Gaussian with the maximum heat produced on the optical axis. In general it will also be desirable to avoid the use of expensive diamond and to correct both the thermal lensing and the thermal stress induced birefringence over a wide range of operating temperatures. An example that meets these goals is that of Ti:sapphire gain and undoped sapphire cooling elements pumped by a Gaussian distribution of power having a maximum on the optical axis and having barriers in the Ti:sapphire to radial heat flow and a radially varying heat transfer coefficient between the gain and cooling elements that yields a temperature profile in the gain element that is similar, but of opposite sign to that in the cooling element. Given the similar properties of the gain and cooling element this cancellation of the optical index variation will be accompanied with a similar cancellation in the net induced stress birefringence. We show in FIG. 7 the temperature variations for such a case. We have calculated the performance of a solar pumped structure of this kind and find an average output power of 135 kW under conditions that lead to an approximate cancellation of both thermal lensing and stress induced birefringence. We find a suitable length for this solar pumping case to be 2 m. Under these circumstances, and also for substantially shorter gain lengths, thermal shock is also not a limiting factor.

Many modifications and other embodiments of the inventions set forth in the accompanying documents and this addendum will come to mind to one skilled in the art to which these inventions pertain having the benefit of the teachings presented in the accompanying documents. Therefore, it is to be understood that the inventions are not to be limited to the specific embodiments disclosed and that modifications and other embodiments are intended to be included within the scope of the invention. Although specific terms are employed herein, they are used in a generic and descriptive sense only and not for purposes of limitation.

That which is claimed is:

1. A solid state laser medium comprising:
   alternating layers of at least one laser gain element and at least one cooling element mated at an interface, said interface having a center point at or near the optic axis of the laser medium,
   wherein the surface of at least one of the gain element and cooling element is physically modified at the interface such that the heat transfer coefficient at the interface decreases radially from the center point.

2. The solid state laser medium of claim 1, wherein the surface is modified at the interface such that the heat transfer coefficient decreases radially in a manner that minimizes the net optical distortion of the laser medium.

3. The solid state laser medium of claim 1, further comprising barriers to radial heat flow within the gain element.

4. The solid state laser medium of claim 1, wherein the surface is physically modified by etching the surface to create a pattern of gaps at the interface.

5. The solid state laser medium of claim 1, wherein the surface is physically modified by epitaxially growing a thin layer of material on the surface having a regular pattern of holes formed in the epitaxial material at the interface.

6. The solid state laser medium of claim 1, wherein gaps or holes at the interface are at least partially filled with a material having the same or substantially similar refractive index as either the gain element or the cooling element but having lower effective thermal conductivity than either the gain element or the cooling element.

7. The solid state laser medium of claim 1, wherein the layers have a disk-like aspect ratio and are layered to form a cylindrical rod.

8. The solid state laser medium of claim 7, wherein a cooling element forms each end of the cylindrical rod.

9. The solid state laser medium of claim 1, wherein the layers have a disk-like aspect ratio and the gain element layers are insulated at their outer edges.

10. The solid state laser medium of claim 1, wherein the gain element and cooling element are formed from dissimilar materials.

11. The solid state laser medium of claim 10, wherein the gain medium material is selected from Ti:sapphire, Nd:YAG, and Nd:YLF, and the cooling element material is selected from diamond and undoped sapphire.

12. The solid states laser medium of claim 1, wherein the gain element and cooling element are formed from doped and undoped variations, respectively, of the same material.

13. The solid state laser medium of claim 12, wherein the gain element material is Ti:sapphire and the cooling element material is undoped sapphire.

14. A low-distortion solid state laser medium comprising:
   alternating layers of at least one laser gain element and at least one cooling element mated at an interface, wherein the gain element and cooling element are have disk-like aspect ratios and are layered to form a cylindrical gain rod, said interface having a center point at or near the optic axis of the laser medium,
   wherein the surface of at least one of the gain element and cooling element is physically modified at the interface such that the heat transfer coefficient at the interface decreases radially from the center point according to equation (1):

$$h(r) = \gamma_0 l / [\Delta T_{ds0} + \gamma_0 r^2 / (4\kappa_d)] \quad (1)$$

where $h(r)$ is the heat transfer coefficient, $\gamma_0$ is the heat input, 2 1 is the thickness of the gain element, $\Delta T_{ds0}$ is the temperature difference between the gain element and the cooling element at $r=0$, $r$ is the radial distance from the optical axis at the center of the gain rod, and $\kappa_d$ is the thermal conductivity of the cooling element.

15. A method of removing heat from a solid state laser medium comprising the steps of:
   providing a laser medium comprising alternating layers of at least one gain element and at least one cooling element mated at an interface, said interface having a center point at or near the optic axis of the laser medium, wherein the surface of at least one of the gain element and cooling element is physically modified at the interface such that the heat transfer coefficient at the interface decreases radially from the center point, and
   propagating a laser through the laser medium, thereby generating heat in and around the optic axis of the laser medium and resulting in the subsequent removal of heat through the cooling element.

* * * * *